United States Patent
Lim et al.

(10) Patent No.: US 10,348,434 B2
(45) Date of Patent: Jul. 9, 2019

(54) METHOD AND USER DEVICE FOR MEASURING REFERENCE SENSITIVITY FOR PROSE COMMUNICATION

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/757,640

(22) PCT Filed: Sep. 20, 2016

(86) PCT No.: PCT/KR2016/010449
§ 371 (c)(1),
(2) Date: Mar. 5, 2018

(87) PCT Pub. No.: WO2017/052146
PCT Pub. Date: Mar. 30, 2017

(65) Prior Publication Data
US 2019/0028219 A1 Jan. 24, 2019

Related U.S. Application Data

(60) Provisional application No. 62/248,318, filed on Oct. 30, 2015, provisional application No. 62/236,985, (Continued)

(51) Int. Cl.
*H04K 1/10* (2006.01)
*H04J 11/00* (2006.01)
(Continued)

(52) U.S. Cl.
CPC ........ *H04J 11/0066* (2013.01); *H04B 17/309* (2015.01); *H04B 17/318* (2015.01);
(Continued)

(58) Field of Classification Search
CPC ... H04L 27/2647; H04L 5/0007; H04L 5/001; H04L 5/003; H04L 25/03292;
(Continued)

(56) References Cited

U.S. PATENT DOCUMENTS

| | | | |
|---|---|---|---|
| 2012/0075989 A1* | 3/2012 | Roessel | H04W 72/04 370/230 |
| 2012/0322455 A1* | 12/2012 | Oh | H04W 72/048 455/450 |

(Continued)

FOREIGN PATENT DOCUMENTS

| | | |
|---|---|---|
| KR | 1020140117283 | 10/2014 |
| WO | 2015009084 | 1/2015 |

OTHER PUBLICATIONS

PCT International Application No. PCT/KR2016/010449, International Search Report dated Dec. 19, 2016, 2 pages.

(Continued)

*Primary Examiner* — Khai Tran
(74) *Attorney, Agent, or Firm* — Lee Hong Degerman Kang Waimey

(57) ABSTRACT

One disclosure of the present specification provides a method for measuring reference sensitivity (REFSENS) for proximity service (ProSe) communication. The method may comprise a step of establishing an uplink center frequency of band 1 of a cellular base station operating as an interference source to be 1922.5 MHz in order to measure the REFSENS, and adjusting a radio frequency (RF) unit in order to establish a channel bandwidth to be 5 MHz, in case that evolved universal terrestrial radio access (E-UTRA) band 1

(Continued)

is established for communication with the cellular base station and E-UTRA band 28 is established for ProSe communication; and a step of establishing an uplink center frequency of band 4 of the cellular base station operating as the interference source to be 1752.5 MHz in order to measure the REFSENS, and adjusting the RF unit in order to establish a channel bandwidth to be 5 MHz, in case that E-UTRA band 4 is established for communication with the cellular base station and E-UTRA band 2 is established for ProSe communication.

12 Claims, 15 Drawing Sheets

Related U.S. Application Data filed on Oct. 5, 2015, provisional application No. 62/232,426, filed on Sep. 24, 2015.

(51) Int. Cl.
| | | |
|---|---|---|
| *H04B 17/309* | (2015.01) | |
| *H04B 17/318* | (2015.01) | |
| *H04B 17/345* | (2015.01) | |
| *H04L 5/00* | (2006.01) | |
| *H04W 8/00* | (2009.01) | |
| *H04W 72/04* | (2009.01) | |
| *H04L 5/14* | (2006.01) | |

(52) U.S. Cl.
CPC ............ *H04B 17/345* (2015.01); *H04J 11/00* (2013.01); *H04L 5/001* (2013.01); *H04L 5/0092* (2013.01); *H04W 8/005* (2013.01); *H04L 5/1469* (2013.01); *H04W 72/0413* (2013.01); *H04W 72/0453* (2013.01)

(58) Field of Classification Search
CPC ............ H04W 72/0413; H04W 52/146; H04B 1/525; H04B 7/12
USPC .................. 375/260, 130, 267; 370/345, 473
See application file for complete search history.

(56) References Cited

U.S. PATENT DOCUMENTS

2013/0051261 A1  2/2013 Kazmi et al.
2016/0353343 A1* 12/2016 Rahman ................ H04W 36/30

OTHER PUBLICATIONS

3rd Generation Partnership Project (3GPP), "Technical Specification Group Radio Access Network; Evolved Universal Terrestrial Radio Access (E-UTRA); and Evolved Packet Core (EPC); Common test environments for User Equipment (UE) conformance testing (Release 8)," 3GPP TS 36.508 V8.4.0, Dec. 2009, 207 pages.
Ericsson, "Frequency bands for D2D Discovery Requirements in Release 13", 3GPP TSG RAN WG4 Meeting #76, R4-155402, Aug. 2015, 6 pages.
3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

* cited by examiner

FIG. 5
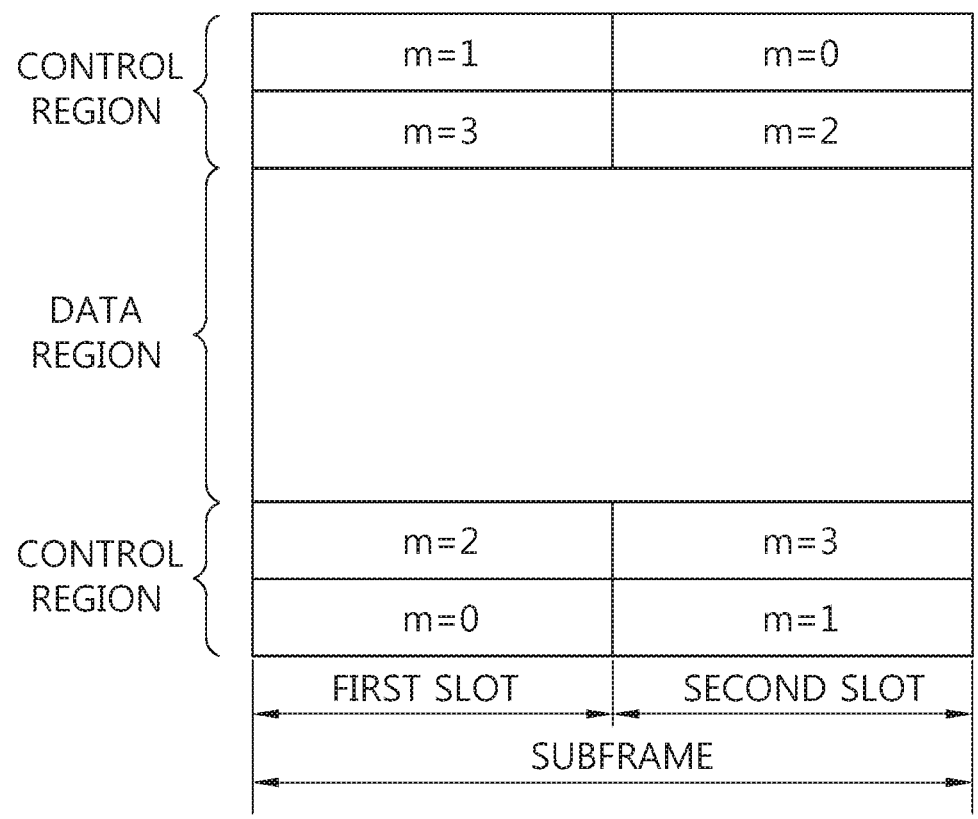
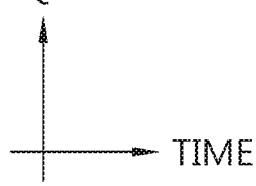

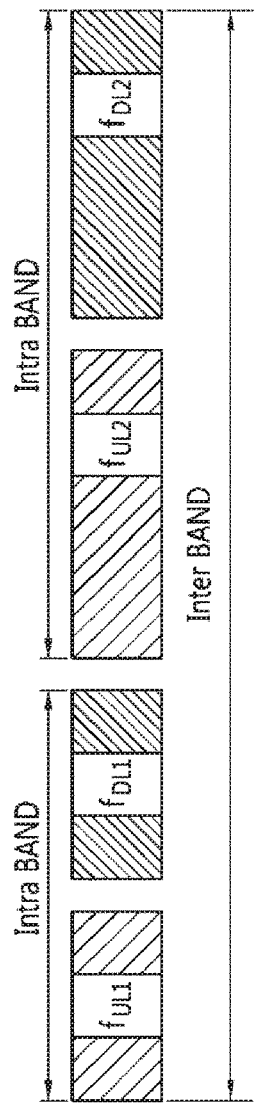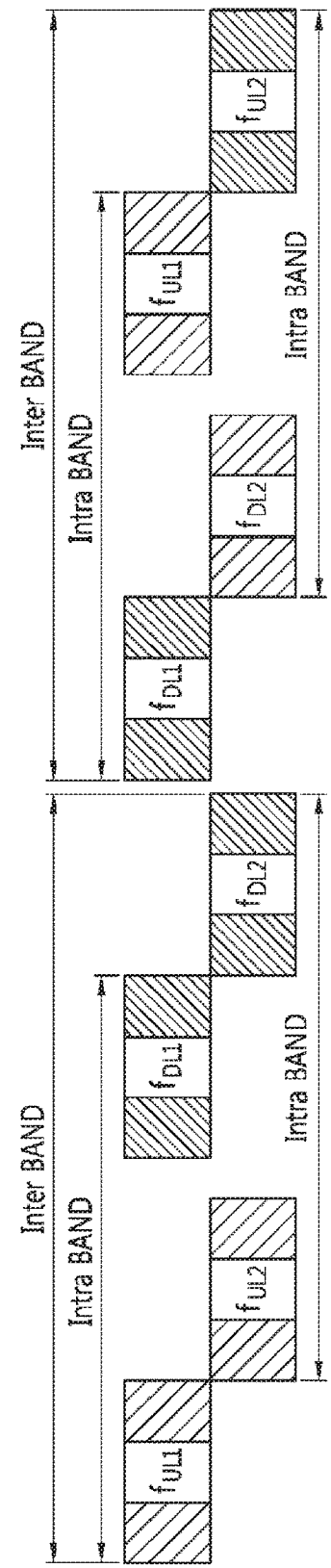

METHOD AND USER DEVICE FOR MEASURING REFERENCE SENSITIVITY FOR PROSE COMMUNICATION

CROSS-REFERENCE TO RELATED APPLICATIONS

This application is the National Stage filing under 35 U.S.C. 371 of International Application No. PCT/KR2016/010449, filed on Sep. 20, 2016, which claims the benefit of U.S. Provisional Application Nos. 62/232,426, filed on Sep. 24, 2015, 62/236,985, filed on Oct. 5, 2015, and 62/248,318, filed on Oct. 30, 2015, the contents of which are all hereby incorporated by reference herein in their entirety.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Development of 3GPP LTE-Advanced (LTE-A) which is an evolution of the 3GPP LTE has been completed in recent years. According to the LTE-A, a carrier aggregation (CA) technology is presented, which aggregates and uses multiple bands into one.

A frequency which can be used for LTE/LTE-A, that is, a carrier is defined in 3GPP by considering radio wave situations of various countries.

On the other hand, due to the increase the user requests on Social Network Service (SNS), the demand for communication between physically close-ranged UEs, i.e., Device to Device (D2D) communication is also increasing. D2D communication is similar to the conventional (or legacy) TDD communication system. However, the D2D communication may perform transmission and/or reception by using an uplink band even in a frequency, which is using an FDD communication system. And, due to such characteristic, D2D communication is being discussed under a name of 'sidelink.' However, there lies a problem in that transmission requirements (Tx requirements) and reception requirements (Rx requirements) for the D2D communication have not yet been proposed.

SUMMARY OF THE INVENTION

Technical Objects

Accordingly, a disclosure of the present specification has been made in an effort to solve the aforementioned problem.

Technical Solutions

To achieve the foregoing purposes, the disclosure of the present invention proposes a method for measuring a reference sensitivity (REFSENS) for a proximity service (ProSe) communication. The method may comprise: controlling a radio frequency (RF) unit, for measuring the REFSENS, to set an uplink center frequency of a band 1 of a cellular base station which operates as an interference source to 1922.5 MHz and set a channel bandwidth to 5 MHz, if an evolved universal terrestrial radio access (E-UTRA) band 1 is configured for a communication with the cellular base station and if an E-UTRA band 28 is configured for the Prose communication; and controlling the RF unit, for measuring the REFSENS, to set an uplink center frequency of a band 4 of the cellular base station which operates the interference source to 1752.5 MHz and set the channel bandwidth to 5 MHz, if an E-UTRA band 4 is configured for the communication with the cellular base station and if an E-UTRA band 2 is configured for the Prose communication.

The Band 28 may correspond to a band in which a serving cell of a cellular base station is not operated or may correspond to a band in which a secondary cell (Scell) of the base station is operated.

The Band 2 may correspond to a band in which a serving cell of a cellular base station is not operated or may correspond to a band in which a secondary cell (Scell) of the base station is operated.

Also, in order to achieve the foregoing purposes, the disclosure of the present invention proposes a user equipment for measuring a reference sensitivity (REFSENS) for a proximity service (ProSe) communication. The user equipment may comprise: a radio frequency (RF) unit; and a processor configured to control the RF unit. The processor controls the RF unit, for measuring the REFSENS, to set an uplink center frequency of a band 1 of a cellular base station which operates as an interference source to 1922.5 MHz and set a channel bandwidth to 5 MHz, if an evolved universal terrestrial radio access (E-UTRA) band 1 is configured for a communication with the cellular base station and if an E-UTRA band 28 is configured for the Prose communication. The processor controls the RF unit, for measuring the REFSENS, to set an uplink center frequency of a band 4 of the cellular base station which operates the interference source to 1752.5 MHz and set the channel bandwidth to 5 MHz, if an E-UTRA band 4 is configured for the communication with the cellular base station and if an E-UTRA band 2 is configured for the Prose communication.

Effects of the Invention

According to a disclosure of the present invention, the above problem of the related art is solved.

BRIEF DESCRIPTION OF THE DRAWINGS

FIG. 5 illustrates the architecture of an uplink subframe in 3GPP LTE.

FIGS. 7A and 7B are conceptual views illustrating inter-band carrier aggregation (CA).

DESCRIPTION OF EXEMPLARY EMBODIMENTS

Figure 1:
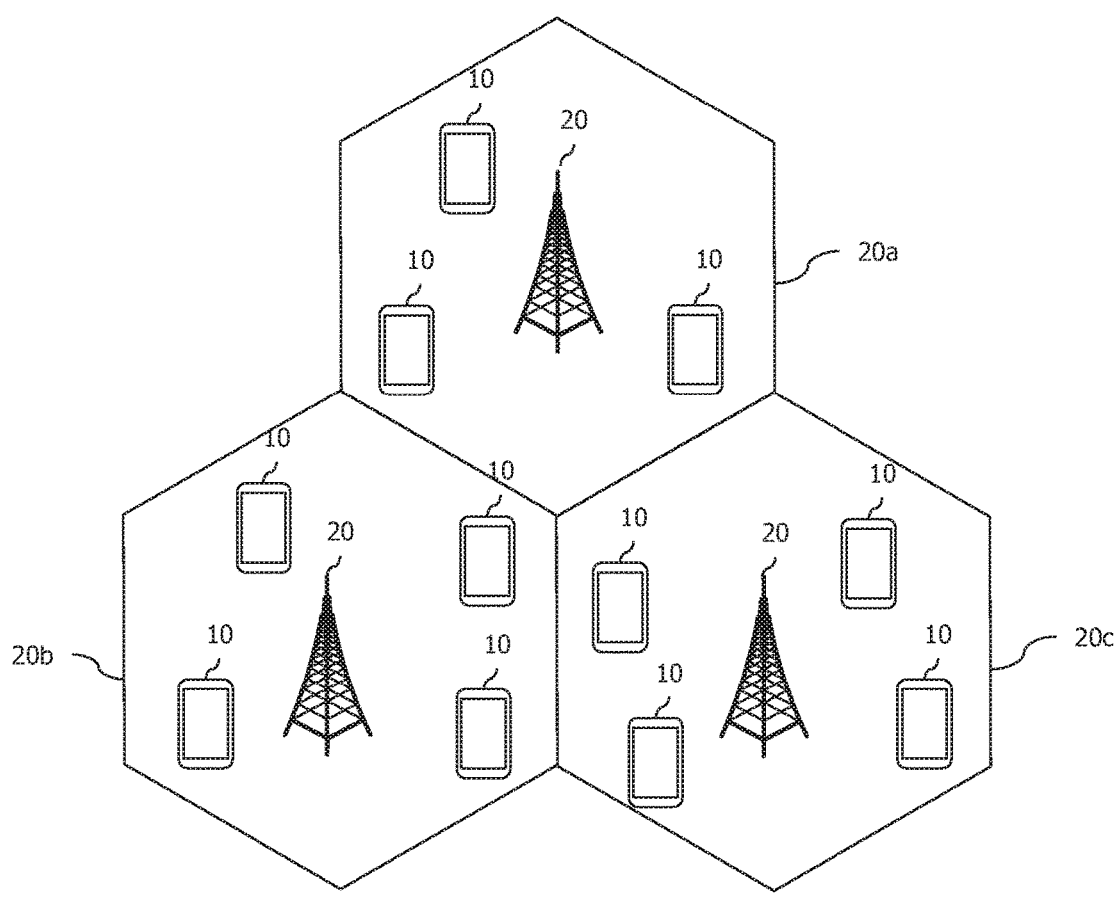
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
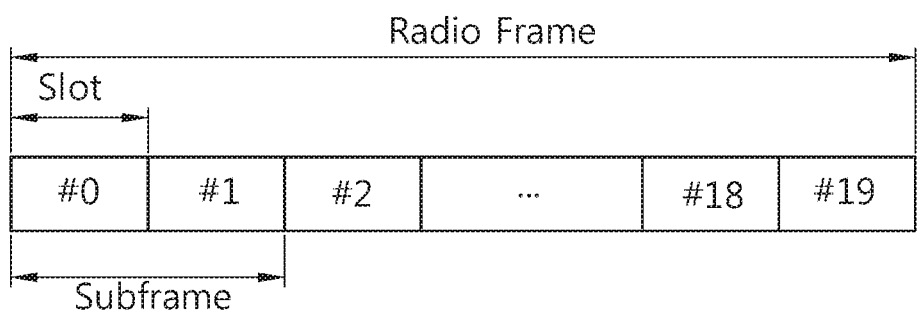
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
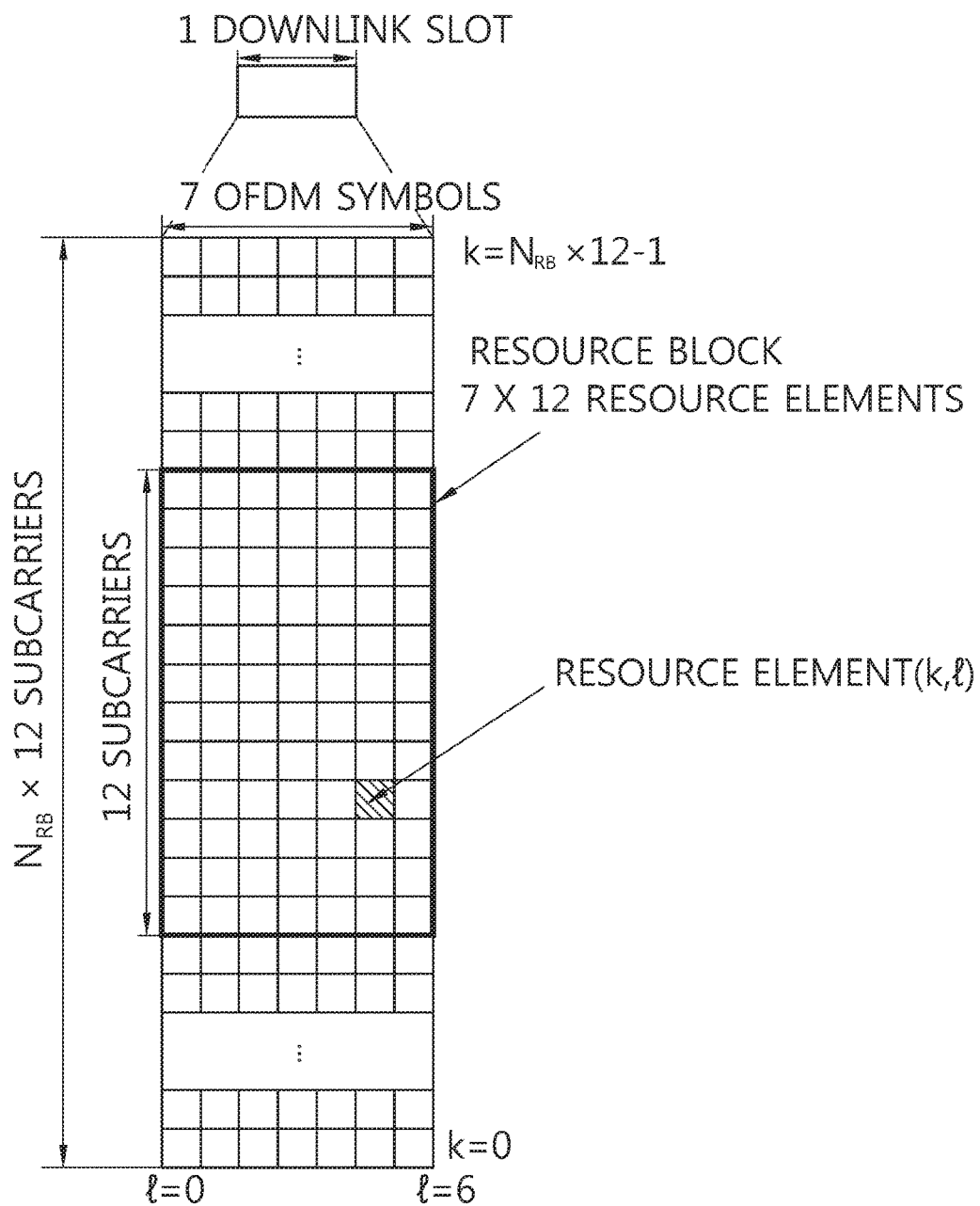
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
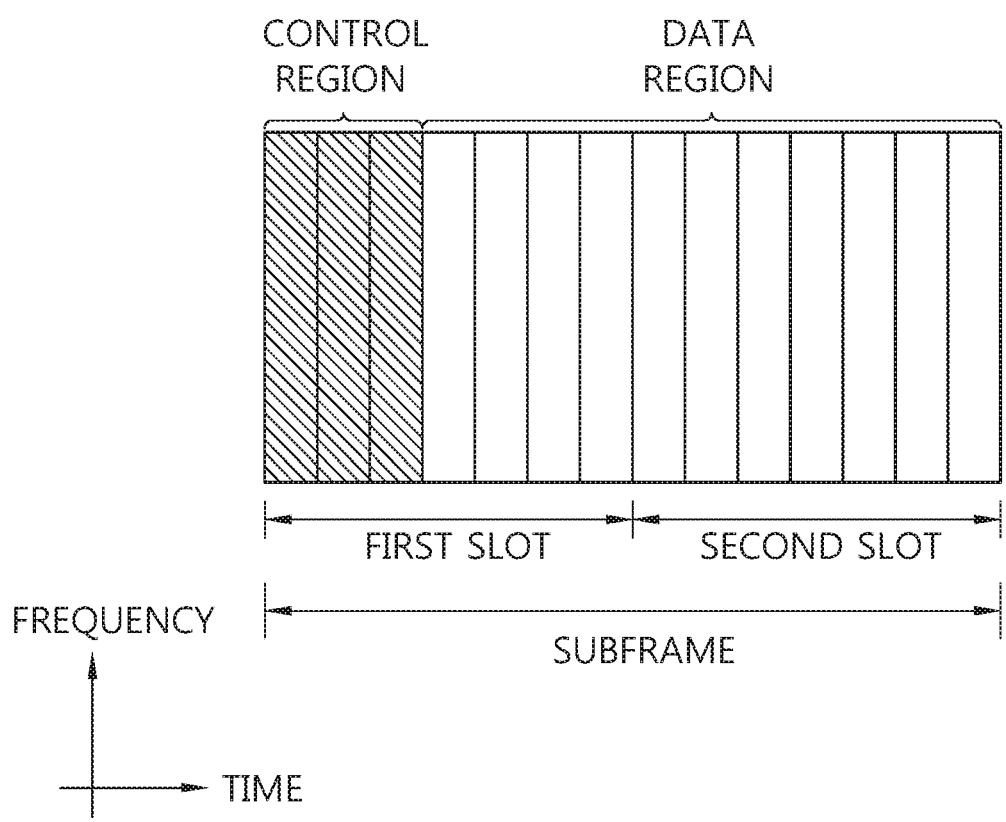
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
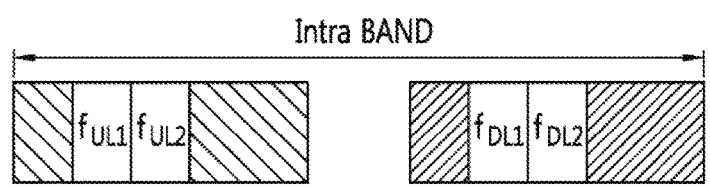
FIGS. 6A and 6B are conceptual views illustrating intra-band carrier aggregation (CA).
Figure 6B:
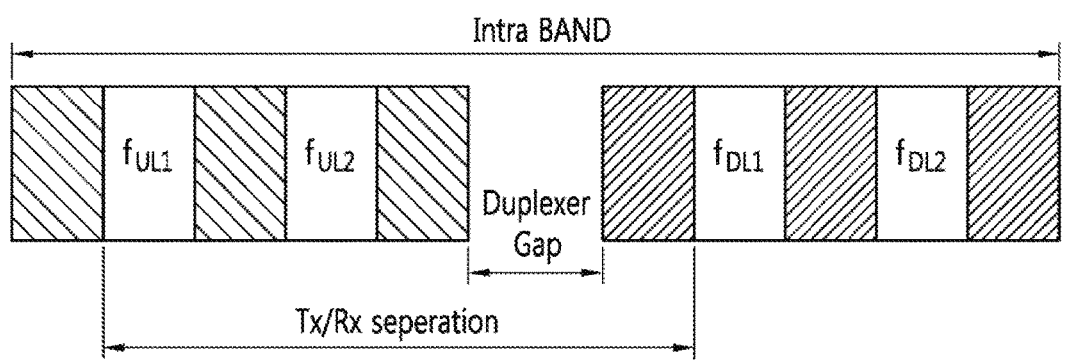

FIGS. 6a and 6b are concept views illustrating intra-band carrier aggregation (CA).

FIG. 6a illustrates intra-band contiguous CA, and FIG. 6b illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 6a and the intra-band non-contiguous CA shown in FIG. 6b.

FIGS. 7a and 7b are concept views illustrating inter-band carrier aggregation.

FIG. 7a illustrates a combination of a lower band and a higher band for inter-band CA, and FIG. 7b illustrates a combination of similar frequency bands for inter-band CA.

In other words, the inter-band carrier aggregation may be separated into inter-band CA between carriers of a low band and a high band having different RF characteristics of inter-band CA as shown in FIG. 7a and inter-band CA of similar frequencies that may use a common RF terminal per component carrier due to similar radio frequency (RF) characteristics as shown in FIG. 7b.

TABLE 1

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| 64 | Reserved | Reserved | FDD |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A N/A | 738 MHz 758 MHz | FDD |

TABLE 1-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
| --- | --- | --- | --- |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5725 MHz | TDD |
| 47 | 5855 MHz-5925 MHz | 5855 MHz-5925 MHz | TDD |

In the 3GPP LTE/LTE-A system, operating bands for a downlink and an uplink are defined in Table 1, which is presented above. Based on Table 1, 4 different CA cases of FIG. 6 and FIG. 7 will hereinafter be described.

Herein, FUL_low indicates a lowest frequency of an uplink operating band. And, FUL_high indicates a highest frequency of an uplink operating band. Also, FDL_low indicates a lowest frequency of a downlink operating band. And, FDL_high indicates a highest frequency of a downlink operating band.

When the operating band is determined, as shown in Table 1, a frequency distribution organization of each country may assign (or allocate) a specific frequency to a service provider in accordance with the situation of each country.

Meanwhile, as described above, the 3GPP LTE system supports 1.4 MHz, 3 MHz, 5 MHz, 10 MHz, 15 MHz, and 20 MHz as the channel bandwidth. The relationship between such channel bandwidths and a number of resource blocks is as shown below in the following table.

TABLE 2

| | Channel bandwidth BWChannel [MHz] | | | | |
| --- | --- | --- | --- | --- | --- |
| | 1.4 | 3 | 5 | 10 | 15 | 20 |
| Transmission Bandwidth configuration NRB | 6 | 15 | 25 | 50 | 75 | 100 |

Meanwhile, due to the wireless transmission, unwanted emission may occur to bands that are adjacent to one another. At this point, the amount of interference, which is caused by the emission according to the transmission of the base station, and which is led into an adjacent (or neighboring) band, may be reduced to an approved reference standard or below by adding an RF filter that is designed to have a large size at a high cost due to the characteristics of the base station. Conversely, in case of a user equipment, due to the limited size of a user equipment, the limited price range of a power amplifier or a pre-duplex RF filter device, and so on, it is difficult to prevent unwanted emission to be led into an adjacent band.

Therefore, limiting the transmission power of the user equipment is necessary.

In an LTE system, a maximum power (Pcmax) that can actually be used by the user equipment may be simply expressed as presented below.

$$P_{cmax} = \text{Min}(P_{emax}, P_{umax}) \quad \text{[Equation 1]}$$

Herein, Pcmax indicates to a maximum power (actual maximum transmission power) that can be transmitted by the user equipment from its corresponding cell, and Pemax indicates to a maximum power than can be used within a corresponding cell to which the base station performs signaling. Also, Pumax refers to power that considers a Maximum Power Reduction (hereinafter referred to as MPR), an additional-MPR (hereinafter referred to as A-MPR), and so on, in the maximum power ($P_{PowerClass}$) of the user equipment itself.

A maximum power ($P_{PowerClass}$) of the user equipment itself is as shown below in the following table.

TABLE 3

| Operating band | Power Class 1 (dBm) | Power Class 3 (dBm) |
| --- | --- | --- |
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 32, 65, 66, 67, 33, 34, 35, 36, 37, 38, 39, 40, 41, 42, 43, 44, 45, 46, 47 | | 23 dBm |
| 14 | 31 dBm | |

Meanwhile, in case of an Intra Band-Contiguous CA, the maximum power ($P_{PowerClass}$) of the user equipment itself is as shown below in the following table.

TABLE 4

| Operating band | Power Class 3 (dBm) |
| --- | --- |
| CA_1C | 23 dBm |
| CA_3C | 23 dBm |
| CA_7C | 23 dBm |
| CA_23B | 23 dBm |
| CA_27B | 23 dBm |
| CA_38C | 23 dBm |
| CA_39C | 23 dBm |
| CA_40C | 23 dBm |
| CA_40D | 23 dBm |
| CA_41C | 23 dBm |
| CA_41D | 23 dBm |
| CA_42C | 23 dBm |

Figure 8:
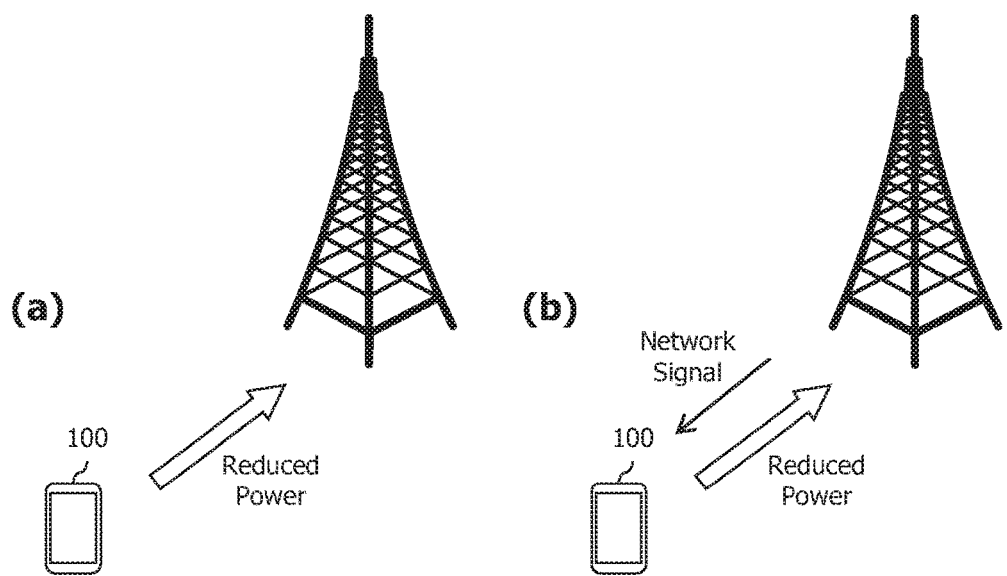
FIG. 8 is an exemplary diagram showing a method for limiting the transmission power of a user equipment.

FIG. 8 is an exemplary diagram showing a method for limiting the transmission power of a user equipment.

As shown in (a) of FIG. 8, the user equipment (UE) 100 performs transmission by limiting its transmission power.

In case a peak-to-average power ratio (PAPR) is high, linearity of the power amplifier (PA) may be reduced. And, in order to maintain such linearity, a maximum power reduction (MPR) value, which is used for limiting the transmission power, may be applied to have a maximum value of 3 dB in accordance with the modulation scheme. This is as shown below in the following table.

(A) MPR According to 3GPP Release 11

Meanwhile, according to 3GPP Release 11, the user equipment may adopt a multi-clustered transmission in a single component carrier (CC) and may simultaneously transmit a PUSCH and a PUCCH. As described above, if the PUSCH and the PUCCH are transmitted at the same time, the size of an IM3 component (which refers to a distortion signal that is generated by intermodulation), which occurs in an out-of-band domain, may become larger as compared to its initial (or conventional) size with the existing size. And, this may act as a larger interference to an adjacent (or neighboring) band. Accordingly, the MPR value may be configured in order to satisfy the emission requirements of a user equipment, which are to be achieved by any user equipment performing uplink transmission, wherein the emission requirement includes a general spurious emission, an adjacent channel leakage ratio (ACLR), and a general spectrum emission mask (SEM).

(B) A-MPR

As shown in (b) of FIG. 8, it is apparent that the base station may apply an additional maximum power reduction (A-MPR) by transmitting network signals (NS) to the user equipment 100. Unlike the above-described MPR, in order to avoid causing influence on adjacent bands, the A-MPR allows the base station to transmit a network signal (NS) to a user equipment 100, which operates only in a particular operating band, so that the corresponding user equipment 100 can additionally reduce power. More specifically, when a UE applying MPR receives a network signal (NS), the transmission power is determined by additionally applying an A-MPR.

(C) A-MPR According to CA

On the other hand, in case of considering the CA, a channel bandwidth of an uplink may be increased to a maximum band of 40 MHz (20 MHz+20 MHz). And, accordingly, a greater MPR value is required. Therefore, in case the base station transmits a network signal to the UE in order to protect a specific band in a CA environment, by performing additional power reduction in the UE operating in a specific band, the base station may protect the neighboring (or adjacent) band.

<Adoption of Small Cells>

Meanwhile, in a next generation mobile communication system, small cells having a small cell coverage radius is expected to be added to the coverage of the conventional (or legacy) cell, and the small cells are expected to be capable of processing a larger traffic. Since the conventional cell has a larger cell coverage than the small cells, the conventional cell may also be referred to as a Macro cell. Hereinafter, this will be described in more detail with reference to FIG. 9.

Figure 9:
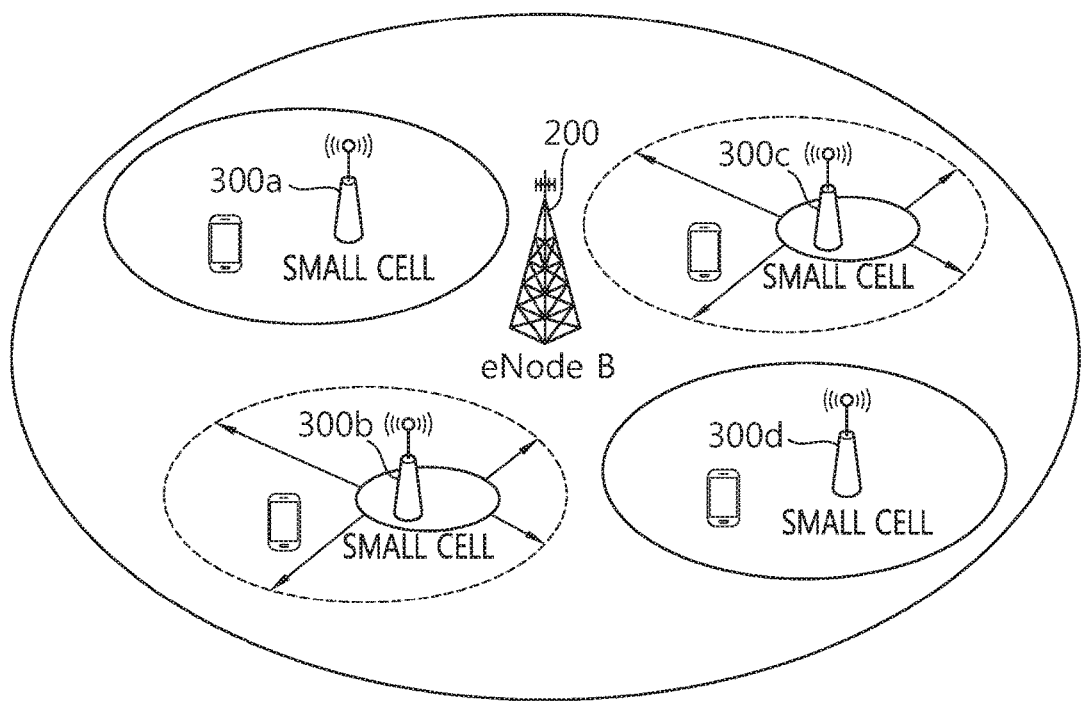
FIG. 9 illustrates a heterogeneous network environment, wherein a macro cell and small cells co-exist, the heterogeneous network environment being likely to become the next generation wireless communication system.

FIG. 9 illustrates a heterogeneous network environment, wherein a macro cell and small cells co-exist, the heterogeneous network environment being likely to become the next generation wireless communication system.

Referring to FIG. 9, a heterogeneous network environment, wherein a macro cell according to the conventional base station 200 overlaps with small cells according to one or more small base stations 300a, 300b, 300c, and 300d, is presented herein. Since the conventional base station provides a larger coverage than the small base station, the conventional base station is also referred to as macro base station (or Macro eNodeB (MeNB)). In this specification, the terms macro cell and macro base station will be alternately used. A UE that is connected to the macro cell 200 may be referred to as a Macro UE. The Macro UE receives a downlink signal from the macro base station and transmits an uplink signal to the macro base station.

In the above-described heterogeneous network, by setting the macro cell as a primary cell (Pcell), and by setting the small cell as a secondary cell (Scell), the gaps in the coverage area (hereinafter referred to as coverage gaps) may be filled. Furthermore, by setting the small cell as the primary cell (Pcell), and by setting the macro cell as the secondary cell (Scell), boosting of the overall performance may be achieved.

<Device to Device (D2D) Communication>

Hereinafter, Device to Device (D2D) communication, which is expected to be applied in the next generation communication system will be described in detail.

Figure 10A:
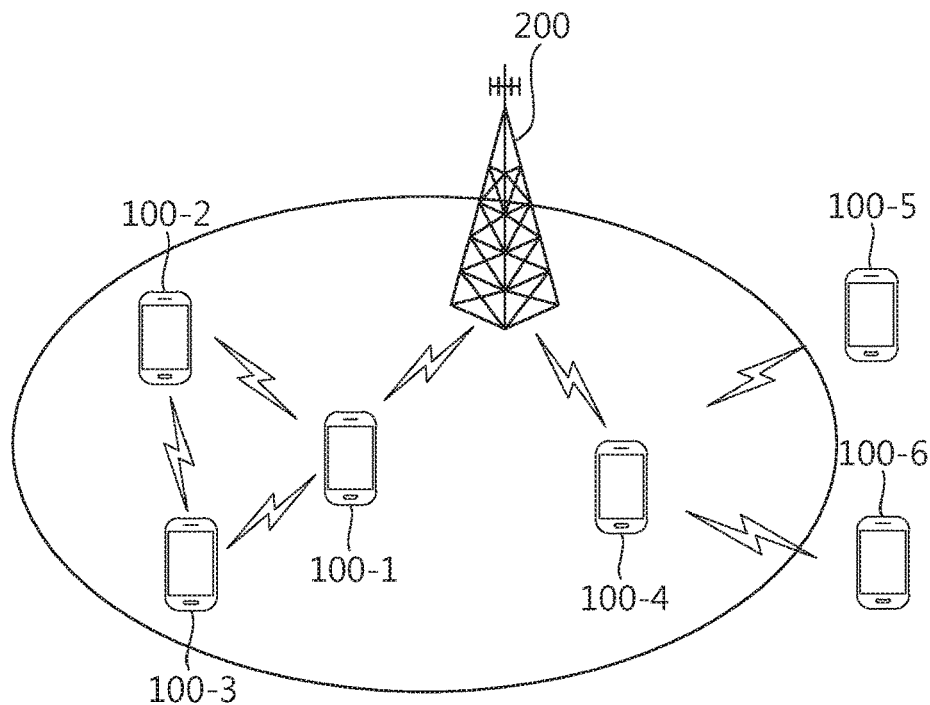
FIG. 10a illustrates a concept of the Device to Device (D2D) communication, which is expected to be applied in the next generation communication system.

FIG. 10a illustrates a concept of the Device to Device (D2D) communication, which is expected to be applied in the next generation communication system.

Due to the increase the user requests on Social Network Service (SNS), the demand for communication between physically close-ranged UEs, i.e., Device to Device (D2D) communication is also increasing.

In order to reflect the above-described requirements, as shown in FIG. 10a, a solution allowing direct communication to be carried out among UE#1 100-1, UE#2 100-2, and UE#3 100-3 or among UE#4 100-4, UE#5 100-5, and UE#6 100-6, any intervention from the base station (or eNodeB) 200 is currently under discussion. Evidently, direct communication may be carried out between UE#1 100-1 and UE#4 100-4 with the help of the base station (eNodeB). Meanwhile, UE#1 100-1 may perform a function of a relay station for UE#2 100-2 and UE#3 100-3. Similarly, UE#4 100-4 may perform a function of a relay station for UE#5 100-5 and UE#6 100-6, which are located further away from the center of the cell.

Meanwhile, a link between UEs being used for the D2D communication is referred to as a Sidelink. And, as described above, this corresponds to a new type of link, which is similar to the TDD communication system, and which is defined to be capable of using an uplink band for transmitting and reception signals in an FDD communication as well. Additionally, the D2D communication is also referred to as a Proximity Service (ProSe) communication.

Physical channels that are used in the sidelink are listed below.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

As described above, discussions are being made on the adoption of D2D communication between UEs in the next generation system.

Figure 10B:
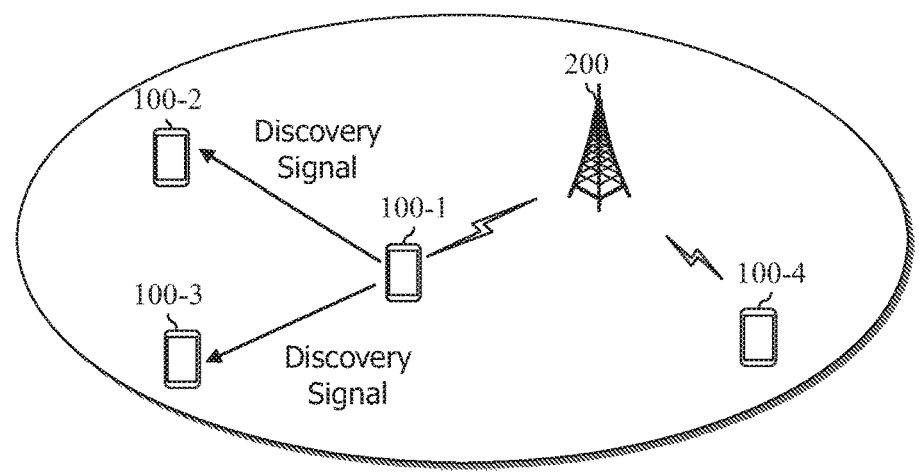
FIG. 10b illustrates an example of transmitting a search signal for D2D communication.

FIG. 10b illustrates an example of transmitting a discovery signal for D2D communication.

As shown in FIG. 10b, UE#1 100-1 may transmit a Discovery Signal, in order to discover whether or not a UE being adequate for D2D communication exists in its surrounding area, or in order to notify its presence to any neighboring UE.

Meanwhile, resources for sidelink communication may be allocated according to 2 different modes, which are described below.

A first mode (also referred to as Mode I) corresponds to resource for sidelink communication being allocated by a serving cell. For this, the UE should be in a RRC connected state. The UE requests resource allocation to a cellular serving cell, and the serving cell allocates resources for the transmission of sidelink control information and data.

A second mode (also referred to as Mode II) corresponds to having the UE select its own resources. The UE selects its own resources for sidelink communication from a resource pool.

Figure 11A:
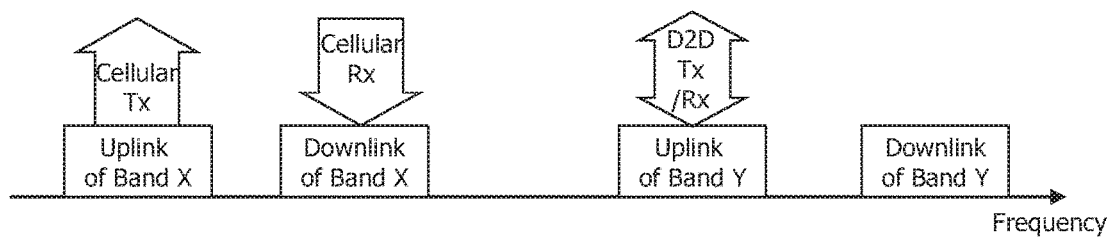
FIG. 11a illustrates an example wherein the band being used for the D2D communication and the LTE/LTE-A band being used for the cellular communication are different from one another.
Figure 11B:
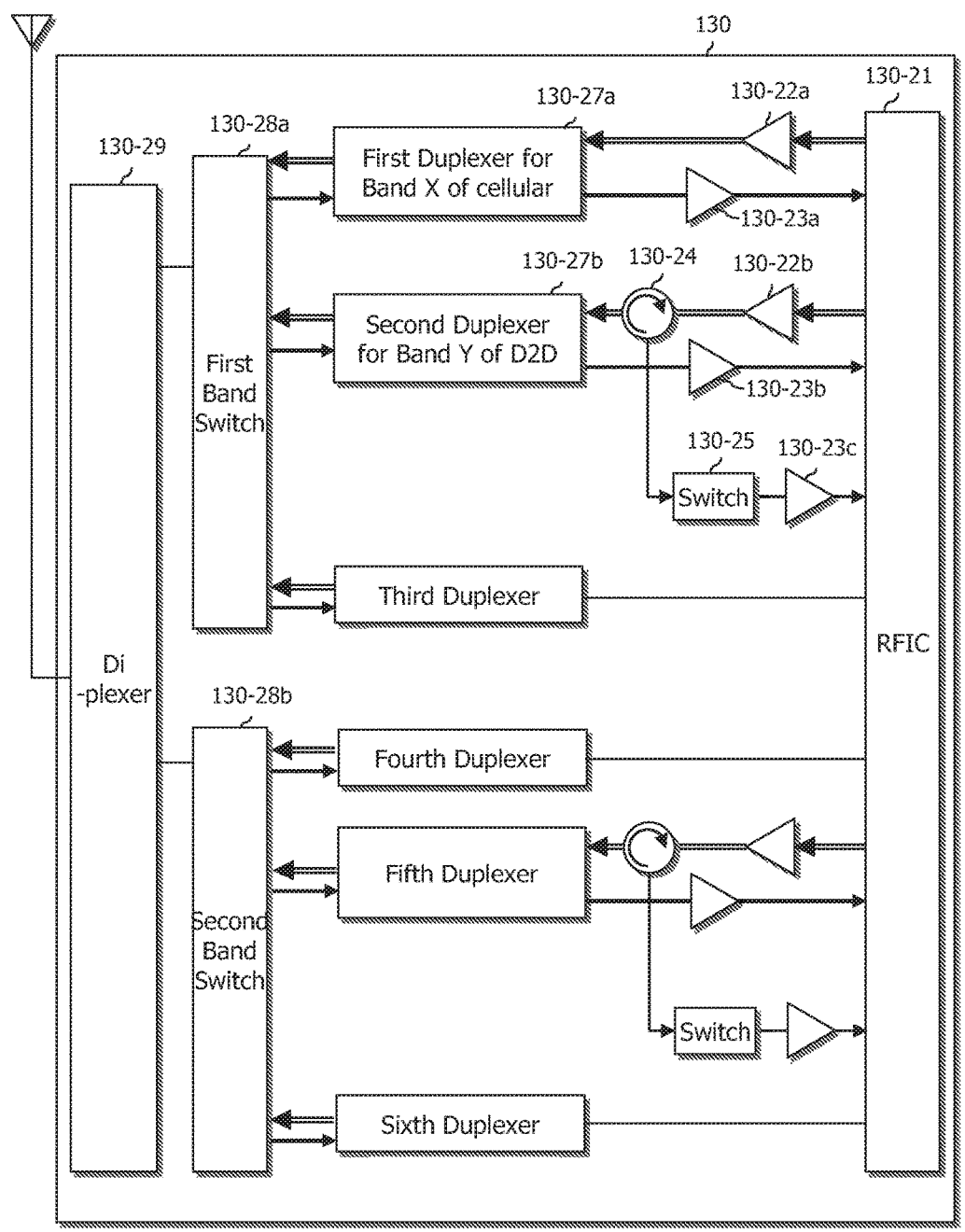
FIG. 11b illustrates an exemplary RF structure.

FIG. 11a illustrates an example wherein the band being used for the D2D communication and the LTE/LTE-A band being used for the cellular communication are different from one another, and FIG. 11b illustrates an exemplary RF structure.

As shown in FIG. 11a, an operation band of D2D communication and an operation band of cellular communication may be different from one another. This is similar to the operations for the legacy inter-band multiple component carriers (MCC). Accordingly, a structure using a radio frequency integrated circuit (RFIC) (which includes an amplifier, a synthesizer, a filter, and a baseband unit) accommodating RF chains that are allocated for each band, which is similar to the structure of the LTE-A Release 10, is proposed, as shown in FIG. 11b.

Referring to FIG. 11b, an RFIC 130-21 accommodating multiple RF chains, multiple duplexers, a first band (e.g., high band) switch 130-28a for differentiating multiple high bands, a second band (e.g., low band) switch 130-28b for differentiating multiple low bands, and a diplexer 130-29 are shown in the drawing.

Among the multiple duplexers, a first duplexer 130-27a separates transmission signals and reception signals in Band X for the cellular communication. A first PA 130-22a and a first LNA 130-23a are connected between the first duplexer 130-27a and the RFIC 130-21.

Only the Band X is used for the cellular communication, and Band Y is de-activated, and, in case the Band Y is used for the D2D communication, among the multiple duplexers, a second duplexer 130-27b separates D2D transmission signals and D2D reception signals in Band Y for the D2D communication. A second PA 130-22b, a second LNA 130-23b, a directionality coupler 130-24, a switch 130-25, and a third LNA 130-23c are connected between the second duplexer 130-27b and the RFIC 130-21.

Meanwhile, among the multiple duplexers, a third duplexer separates transmission signals and reception signals in Band Z.

The diplexer 130-29 performs the function of synthesizing/separating transmission/reception signals of a low band and a high band, and the diplexer 130-29 is connected to a switch for a first band (e.g., high band) 130-28a and a switch for a second band (e.g., low band) 130-28a.

The first band switch 130-28a selectively transmits and receives signals to and from any one of a first duplexer 130-27a for Band X of the cellular communication, a second duplexer 130-27b for Band Y of the D2D communication, and a third duplexer 130-27c for Band Z. Similarly, the second band switch 130-28b selectively transmits and receives signals to and from any one of a fourth duplexer, a fifth duplexer, and a sixth duplexer.

The first duplexer 130-27a separates transmission signals and reception signals of the cellular communication and transports the separated signals between the first band switch 130-28a and the RFIC 130-21. A transmission line between the first band duplexer 130-27a and the RFIC 130-21 is connected to the first PA 130-22a, and a receiving line is connected to the first LNA 130-23a.

The second duplexer 130-27b separates transmission signals and reception signals of the D2D communication and transports the separated signals between the first band switch 130-28a and the RFIC 130-21. A transmission line between the second band duplexer 130-27b and the RFIC 130-21 is connected to the first PA 130-22a and a directionality coupler 130-24, and a receiving line is connected to the second LNA 130-23b. The directionality coupler 130-24 is connected to a switch 130-25 and the third 130-23c.

Meanwhile, the second band switch 130-28b may differentiate multiple low bands and may be connected to multiple duplexers. Among the multiple duplexers, for example, a fifth band duplexer separates transmission signals and reception signals of the D2D communication and transports the separated signals between the second band switch and the RFIC 130-21. A transmission line between the fifth duplexer and the RFIC 130-21 is connected to a PA and a directionality coupler, and a receiving line is connected to an LNA. The directionality coupler is connected to a switch and an LNA.

The drawing shown in FIG. 11b is merely an example, and, therefore, the D2D communication and the cellular communication may be simultaneously supported in diverse structures.

The operations of the RF structure shown in FIG. 11b will hereinafter be described in detail in accordance with the transmission and the reception.

The receiving operations will first be described.

When a signal is received through an antenna, the diplexer 130-29 delivers the received signal to any one of the first band switch 130-28a and the second band switch 130-28b. If the first band switch 130-28a receives the received signal (or reception signal) from the diplexer 130-29, the first band switch 130-28a then transmits the signal to any one of the first duplexer 130-27a and the 130-27b. In case the received signal corresponds to a reception signal of the cellular communication, the first duplexer 130-27a delivers the reception signal of the cellular communication to the RFIC 130-21 after passing through the first LNA 130-23a. Additionally, if the received signal corresponds to a reception signal of the D2D communication of the Band Y, the second duplexer 130-27b sends the reception signal of the D2D communication to the directionality coupler 130-24. Then, the directionality coupler 130-24, which has received the reception signal, delivers (or transports) the D2D received signal to the third LNS 130-23c. Thereafter, the reception signal is transported to the RFIC 130-21 after passing through the third LNA 130-23c. If a cellular signal of Band Y is received, the reception signal that has passed through the second duplexer 130-27b is transported to the RFIC 130-21 after passing through the second LNA 130-23b.

Hereinafter, the transmitting operations will be described.

A transmission signal of the cellular communication of Band X, which is outputted from the RFIC 130-21, is amplified after passing through the first PA 130-22a and then delivered to the first duplexer 130-27a. The first duplexer 130-27a transports the amplified transmission signal of the cellular communication to the first band switch 130-28a. Additionally, a transmission signal of the D2D communication of Band Y, which is outputted from the RFIC 130-21, is amplified after passing through the second PA 130-22b and then delivered to the directionality coupler 130-24. Thereafter, the directionality coupler 130-24 transports the amplified transmission signal of the D2D communication to the second duplexer 130-27b. The second duplexer 130-27b transports the amplified transmission signal of the D2D communication to the first band switch 130-28a. The first band switch 130-28a may selectively transport one of the amplified transmission signal of the cellular communication and the amplified transmission signal of the D2D communication to the diplexer 130-29, or the first band switch 130-28a may transmit both transmission signals through a diplexer, which is added between the first band switch and the duplexer.

Disclosure of this Specification

In this specification, transmission requirements (Tx requirements) and reception requirements (Rx requirements)

for the D2D communication will be proposed based on the above-described RF structure.

The aggregation of the carriers for the D2D communication and the carriers for the cellular communication may correspond to the following combinations.

In case of the United States of America, B2(D2D)+B4 (WAN)

In case of Area 1 and Area 3, B28(D2D)+B1(WAN)

Figure 12A:
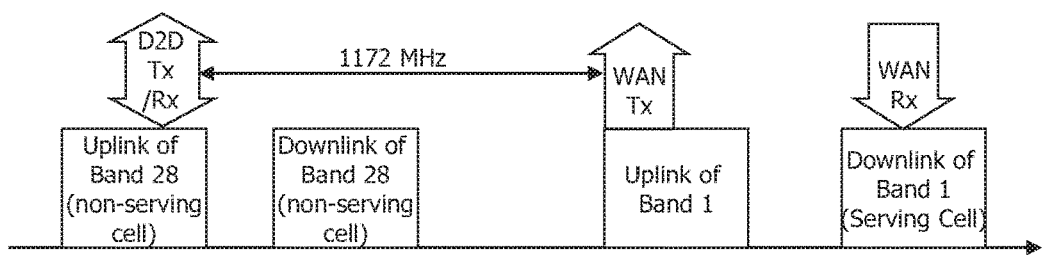
FIG. 12a to FIG. 12c illustrate exemplary usages of Band 28 for the D2D communication and Band 1 for the WAN communication.
Figure 12B:
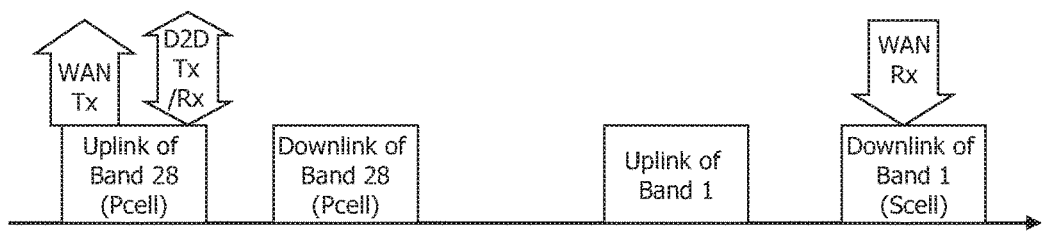
Figure 12C:
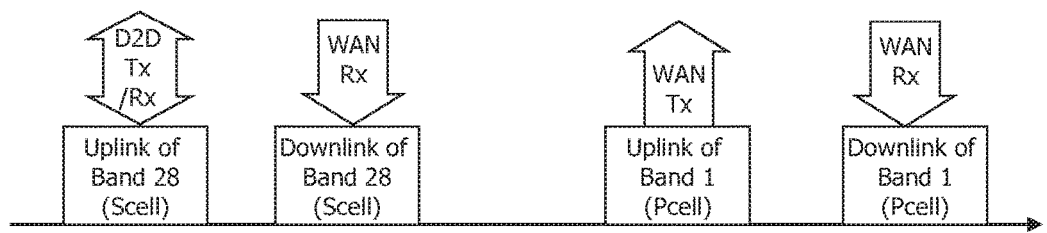

FIG. 12a to FIG. 12c illustrate exemplary usages of Band 28 for the D2D communication and Band 1 for the WAN communication.

As shown in FIG. 12a, Band 1 corresponds to a band through which the user equipment (UE) receives a signal from a serving cell of the base station. However, Band 28 corresponds to a de-activated band that does not perform a cellular service instead of a band that receives data from a serving cell of a cellular base station. At this point, the D2D transmission/reception may be performed over an uplink of Band 28, in which the serving cell does not operate.

As shown in FIG. 12b, Band 28 may correspond to a band operating as a Pcell of a cellular base station, and Band 1 may correspond to a band operating as an Scell of a cellular base station. At this point, the D2D transmission and reception may be performed in an uplink of Band 28, wherein the Pcell of the base station is operated. However, since the D2D operation in the current rel-13 only supports the con-current operations in an inter-band, the simultaneous operations of D2D and WAN in the Pcell will be excluded. Therefore, in this case, the D2D and cellular communication is only operated via TDM.

As shown in FIG. 12c, Band 28 may correspond to a band operating as an Scell of a cellular base station, and Band 1 may correspond to a band operating as a Pcell of a cellular base station. At this point, the D2D transmission and reception may be performed in an uplink of Band 28, wherein the Scell of the base station is operated.

Figure 13A:
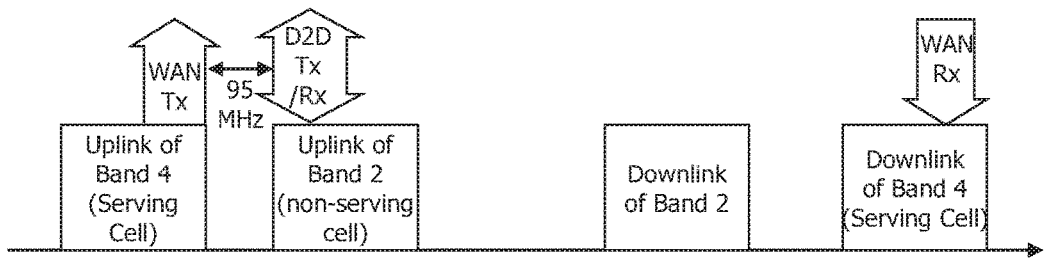
FIG. 13a to FIG. 13c illustrate exemplary usages of Band 2 for the D2D communication and Band 4 for the WAN communication.
Figure 13B:
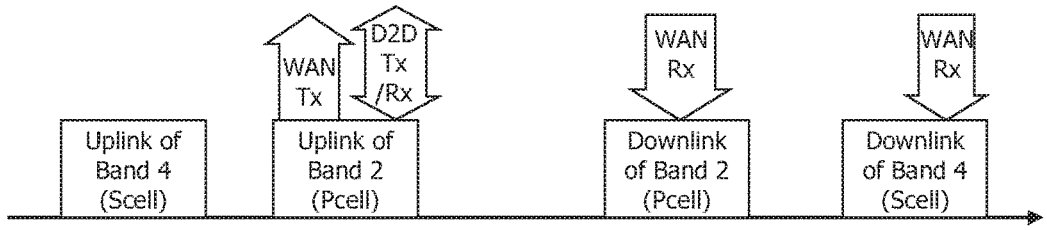
Figure 13C:
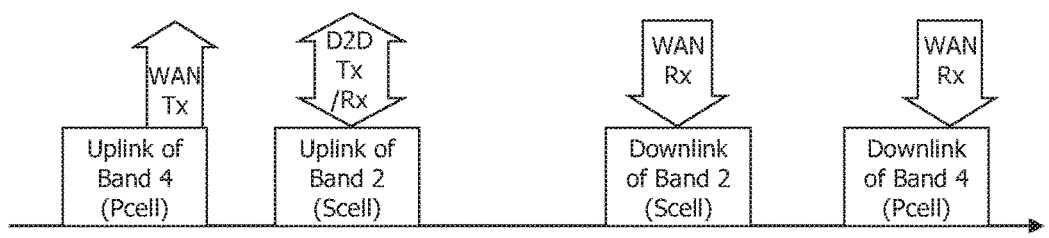

FIG. 13a to FIG. 13c illustrate exemplary usages of Band 2 for the D2D communication and Band 4 for the WAN communication.

As shown in FIG. 13a, Band 4 corresponds to a band in which a serving cell of a cellular base station is operated. However, Band 2 corresponds to a band in which a serving cell of the base station does not operate. At this point, the D2D transmission/reception may be performed over an uplink of Band 2, in which the serving cell does not operate.

As shown in FIG. 13b, Band 2 may correspond to a band operating as a Pcell of a base station, and Band 4 may correspond to a band operating as an Scell of a base station. At this point, the D2D transmission and reception may be performed in an uplink of Band 2, wherein the Pcell of the base station is operated. However, in this case, since a signal transmitting cellular data to the base station from the UE may cause influence in the D2D transmission and reception as a source of interference, the simultaneous transmission of the D2D and cellular communication in such LTE band will be excluded. Therefore, in this case, the D2D and cellular communication is only operated via TDM.

As shown in FIG. 13c, Band 2 may correspond to a band operating as an Scell of a base station, and Band 4 may correspond to a band operating as a Pcell of a base station. At this point, the D2D transmission and reception may be performed in an uplink of Band 2, wherein the Scell of the base station is operated.

As described above, an operating band being used in the D2D communication and an operating band being used in the WAN communication may correspond to an inter-band. Although transmission requirements (Tx Requirements) and reception requirements (Rx Requirements) for 2 uplink transmissions have already been defined in the conventional inter-band carrier aggregation, a standard for supporting simultaneous transmission and reception of the D2D communication using a sidelink and the conventional WAN communication has not yet been defined. Accordingly, this will be described in detail in this specification.

I. Tx Requirements for D2D Transmission

First, the general RF requirements for the conventional inter-band carrier aggregation are indicated in the table shown below.

TABLE 5

| Requirements |
| --- |
| Maximum output power of the UE for carrier aggregation (CA) |
| Set up transmission power for carrier aggregation (CA) |
| Minimum output power of UE for carrier aggregation (CA) |
| Transmission OFF power of UE for carrier aggregation (CA) |
| ON/OFF time mask for carrier aggregation (CA) |
| Power control for carrier aggregation (CA) |
| Frequency error for carrier aggregation (CA) |
| Transmission modulation quality for carrier aggregation (CA) |
| Bandwidth being occupied for carrier aggregation (CA) |
| Spectrum emission mask for carrier aggregation (CA) |
| Adjacent Channel Leakage Ratio |
| Spurious Emission for carrier aggregation (CA) |
| Spurious emission band for co-existence of UEs in carrier aggregation (CA) |
| Transmission intermodulation for carrier aggregation (CA) |

Research has been carried out on which of the RF requirements indicated in the table presented above are to be improved, when the carriers for WAN communication and the carriers for D2D communication are all activated for simultaneous transmission.

The maximum power does not vary due to the Multiple Component Carriers (MCC) operation according to the inter-band carrier aggregation. Therefore, the maximum output power of the D2D transmission should satisfy the requirements corresponding to a total maximum output power of each antenna in the inter-band. Additionally, a set up transmission power for the D2D transmission should be identical to a set up transmission power of a Secondary Component Carrier (SCC) in the inter-band carrier aggregation. And, the set up transmission power of the WAN transmission of a UE should be identical to the set up transmission power of PCC in the inter-band carrier aggregation.

Therefore, the transmission requirements for the simultaneous operation of the WAN transmission and the D2D transmission is described in more detail in the following table.

TABLE 6

| Description | WAN transmission and WAN transmission | WAN transmission and D2D transmission |
| --- | --- | --- |
| Maximum output power of the UE for carrier aggregation (CA) | Summed per each antenna during 2 UL transmissions in the inter-band CA | Summed per each antenna during 2 UL transmissions in the inter-band CA |
| MPR for Modulation/Channel bandwidth (CBW) | Follows MPR per CC | Follows MPR per SSSS |

TABLE 6-continued

| Description | WAN transmission and WAN transmission | WAN transmission and D2D transmission |
| --- | --- | --- |
| Additional requirements on the maximum transmission power of the UE | Follows conventional requirements | Follows conventional requirements |
| Set up transmission power for carrier aggregation (CA) | Pcmax upper/lower values (i.e., tolerated value) during 2 UL transmissions in the inter-band CA | Follows set up transmission power for D2D |
| Minimum output power of UE for carrier aggregation (CA) | Follows minimum power per CC | Follows minimum power per CC |
| Transmission OFF power of UE for carrier aggregation (CA) | For each CC during 2 UL transmissions in the inter-band CA | For each CC during 2 UL transmissions in the inter-band CA |
| ON/OFF time mask for carrier aggregation (CA) | For each CC during 2 UL transmissions in the inter-band CA | Follows conventional requirements |
| Power control for carrier aggregation (CA) | For each CC during 2 UL transmissions in the inter-band CA | For each CC during 2 UL transmissions in the inter-band CA |
| Frequency error for carrier aggregation (CA) | For each CC during 2 UL transmissions in the inter-band CA | For each CC during 2 UL transmissions in the inter-band CA |
| Transmission modulation quality for carrier aggregation (CA) | For each CC during 2 UL transmissions in the inter-band CA | For each CC during 2 UL transmissions in the inter-band CA |
| Bandwidth being occupied for carrier aggregation (CA) | For each CC during 2 UL transmissions in the inter-band CA | For each CC during 2 UL transmissions in the inter-band CA |
| Out-of-Band emission for carrier aggregation (CA) Spectrum emission mask (SEM) Additional SEM | For each CC during 2 UL transmissions in the inter-band CA | For each CC during 2 UL transmissions in the inter-band CA |
| Adjacent Channel Leakage Ratio | For each CC during 2 UL transmissions in the inter-band CA | For each CC during 2 UL transmissions in the inter-band CA |
| Spurious Emission for carrier aggregation (CA) | 2 UL transmissions in the inter-band CA | 2 UL transmissions in the inter-band CA |
| Spurious emission band for co-existence of UEs in carrier aggregation (CA) | 2 UL transmissions in the inter-band CA | 2 UL transmissions in the inter-band CA |
| Transmission intermodulation for carrier aggregation (CA) | For each CC during 2 UL transmissions in the inter-band CA | For each CC during 2 UL transmissions in the inter-band CA |

As described above in Table 6, a standard for the simultaneous operation of the WAN transmission and the D2D transmission should be defined in order to prevent most of the transmission requirements from causing influence on the conventional WAN transmission performance. Accordingly, this specification proposes that most of the transmission requirements for 2 uplink (UL) transmissions in the inter-band carrier aggregation are re-used, wherein only some of the requirements are improved.

Proposal 1: The simultaneous WAN and D2D transmissions should each be performed in a different band. Accordingly, most of the transmission requirements for 2 uplink (UL) transmissions in the inter-band carrier aggregation may be re-used.

II. Rx Requirements for D2D Reception

For the RF reception requirements of the UE, in order to define the reception requirements for the D2D reception, reference may be made to the usage of 2 uplinks in the conventional inter-band carrier aggregation.

TABLE 7

| Category | WAN and WAN | WAN and D2D | Description |
| --- | --- | --- | --- |
| Reference sensitivity for the carrier aggregation (CA) | 2 uplinks in the inter-band CA | D2D reference sensitivity (REFSENS) | A reference sensitivity needs to be defined |
| Maximum input | | WAN: −25 dBm | |

TABLE 7-continued

| Category | WAN and WAN | WAN and D2D | Description |
| --- | --- | --- | --- |
| level | | D2D: −22 dBm | |
| Out-of-Band blocking for CA | Covered by one CC | Not required | Not required |
| Spurious response in CA | Covered by one CC | Not required | Not required |

In the exemplary usages of the Band 1 for the WAN communication and the Band 28 for the D2D communication, as shown in FIG. 12a to FIG. 12c, a tertiary harmonic problem may occur during the WAN reception in Band 1. Accordingly, reference sensitivity exception test requirements may be defined. However, 2 uplink set ups (or configurations) do not always occur during the MCC operation, so as to require the reference sensitivity requirements of the UE to be newly defined. Additionally, as shown in the example of FIG. 12b, the WAN transmission and the D2D transmission and reception are all performed in an uplink band of the Pcell. Herein, since the WAN transmission and the D2D transmission and reception are alternately performed via TDM, when a WAN transmission (Tx) signal exists, a D2D reception signal may not exist at the same time. Therefore, only the examples shown in FIG. 12a to FIG. 12c may be taken into consideration.

Meanwhile, in the exemplary usages of the Band 4 for the WAN communication and the Band 2 for the D2D communication, as shown in FIG. 13a to FIG. 13c, a tertiary intermodulation distortion (IMD) element may flow into a reception frequency of Band 2. Also, a quinary IMD element may flow into a reception frequency of Band 4. It may be determined that this is similar to the inter-band carrier aggregation of Band 2 and Band 4. Accordingly, definition of reception sensitivity exception test requirements may be required. However, as shown in the example of FIG. 13b, the WAN transmission and the D2D transmission and reception are all performed in an uplink band of the Pcell. Herein, since the WAN transmission and the D2D transmission and reception are alternately performed via TDM, when a WAN transmission (Tx) signal exists, a D2D reception signal cannot exist at the same time. Therefore, only the examples shown in FIG. 13a to FIG. 13c may be taken into consideration.

According to the above-described analysis, in a low band and high band inter-band combination, it is apparent that the requirements for the reference sensitivity can be directly re-used.

However, in the usage examples of Band 2 for the D2D communication and Band 4 for the WAN communication, a gap (or distance) between each band should be equal to approximately 95 Mhz. This distance may be ensured by a filter performance.

Accordingly, this specification presents the following proposals.

Proposal 2: For the D2D reception requirements, reference sensitivity and test configurations require research.

Proposal 3: The reference sensitivity requirements in the conventional inter-band carrier aggregation (CA) may be re-used.

On the other hand, as described above, in the examples shown in FIG. 12b and FIG. 13b, the WAN transmission and the D2D transmission and reception are all performed in an uplink band of the Pcell. Herein, since the WAN transmission and the D2D transmission and reception are alternately performed via TDM, when a WAN transmission (Tx) signal exists, a D2D reception signal may not exist at the same time. Therefore, an example where the D2D communication is performed in a carrier band of the Pcell is not required to be considered. In other words, when a reception performance standard is determined, only the example of performing D2D communication in a carrier band of the Scell and the example of performing D2D communication in a carrier band of a non-serving cell may be taken into consideration. Accordingly, this specification presents the following proposals.

Proposal 4: Examples where D2D communication is performed in a carrier band of the Pcell is not required to be taken into consideration.

On the other hand, the table shown below indicates uplink test configurations for D2D reference sensitivity (REFSENS). In the uplink configuration, a channel bandwidth of 5 MHz, which is close to the D2D reception frequency, is taken into consideration.

TABLE 8

| Band Combination/Number of RBs per Channel Bandwidth (NRB)/Duplex Mode | | | | |
|---|---|---|---|---|
| E-UTRA ProSe Band | E-UTRA Uplink Band | Uplink Center Frequency Fc (MHz) | 5 MHz | Duplex Mode |
| 28 | 1 | 1922.5 | 25 | FDD |
| 2 | 4 | 1752.5 | 25 | FDD |

In order to define the discovery signal for D2D and the reception sensitivity (REFSENS) in the D2D communication, when a WAN transmission frequency is close to a D2D reception frequency, a transmission leakage should be taken into consideration. However, in a worst-case example, since the gap between the transmission and reception frequencies is equal to 95 MHz, the influence caused by the transmission leakage may be ignored (or disregarded) by a duplexer attenuation. Accordingly, if a conventional reference measurement channel (RMC) may be re-used, the same REFSENS may be re-used for the D2D operation.

The table shown below indicates requirements for a D2D Direct Discovery reception reference sensitivity.

TABLE 9

| | Channel Bandwidth | | | | | | |
|---|---|---|---|---|---|---|---|
| E-UTRA ProSe Band | 1.4 MHz (dBm) | 3 MHz (dBm) | 5 MHz (dBm) | 10 MHz (dBm) | 15 MHz (dBm) | 20 MHz (dBm) | Duplex Mode |
| 2 | | | −104.1 | −104.1 | −104.1 | −104.1 | HD |
| 28 | | | −104.4 | −104.4 | −104.4 | −102.9 | HD |

Also, the table shown below indicates requirements for the reference sensitivity in a D2D direct communication.

TABLE 10

| | Channel Bandwidth | | | | | | |
|---|---|---|---|---|---|---|---|
| E-UTRA ProSe Band | 1.4 MHz (dBm) | 3 MHz (dBm) | 5 MHz (dBm) | 10 MHz (dBm) | 15 MHz (dBm) | 20 MHz (dBm) | Duplex Mode |
| 2 | | | | N/A | | | HD |
| 28 | | | | −98.9 | | | HD |

Generally, in case a low band and a high band are used for WAN and D2D communication, the D2D reference sensitivity may directly follow the reference sensitivity in the conventional D2D operation, which uses one carrier.

However, if a low band and a low band are combined and used for the WAN and D2D communication, or if a high band and a high band are combined and used, a gap between the transmission frequency and the reception frequency should be taken into consideration for the reference sensitivity.

Accordingly, this specification presents the following proposals.

Proposal 5: In order to simplify the reference sensitivity requirements for D2D, a worst-case scenario, i.e., a case of a 5 MHz channel being close to the D2D reception frequency, should be considered as the test configuration.

Proposal 6: Based on a MCC operation environment between the D2D and the WAN, the conventional reference sensitivity may be used when performing the transmission and reception of the D2D discovery signal and the D2D communication.

Proposal 7: Since the reception requirements may be determined for each of the D2D and the WAN, the definition of additional reception requirements apart from the reception sensitivity standard is not required.

The above described exemplary embodiments of the present invention may be implemented through various means. For example, the exemplary embodiments of the present invention may be implemented by hardware, firmware, software, or a combination thereof. More detailed description will hereinafter be provided with reference to the accompanying drawings.

Figure 14:
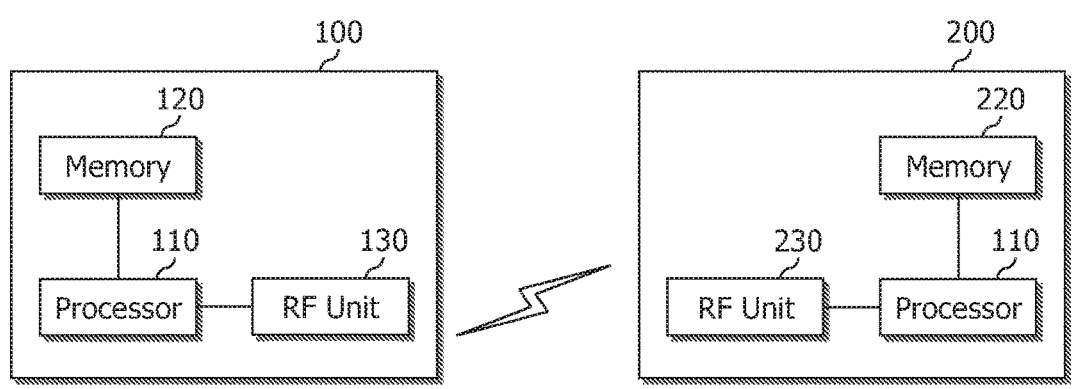
FIG. 14 illustrates a block view showing a wireless communication system in which the disclosure of the present invention is implemented.

FIG. 14 illustrates a block view showing a wireless communication system in which the disclosure of the present invention is implemented.

A base station 200 includes a processor 210, a memory 220, and a radio frequency (RF) unit 230. The memory 220 is connected to the processor 210 to store various information for driving the processor 210. The RF unit 230 is connected to the processor 210 to transmit and/receive a wireless signal. The processor 210 implements a suggested function, procedure, and/or method. An operation of the base station 200 according to the above embodiment may be implemented by the processor 210.

A UE 100 includes a processor 110, a memory 120, and an RF unit 130. The memory 120 is connected to the processor 110 to store various information for driving the processor 110. The RF unit 130 is connected to the processor 110 to transmit and/receive a wireless signal. The processor 110 implements a suggested function, procedure, and/or method.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and so on) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in an order that is different the above-described steps or may be simultaneously performed with the above-described steps. Furthermore, it will be apparent to those skilled in the art that the steps included in the flowchart are not exclusive but include other steps or one or more steps in the flowchart may be removed (or deleting) without causing any influence on the scope and spirit of the present invention.

What is claimed is:

1. A method for measuring, by a device, a reference sensitivity (REFSENS) for a proximity service (ProSe) communication, the method comprising:
   controlling a transceiver of the device to use an uplink carrier for measuring the REFSENS based on an evolved universal terrestrial radio access (E-UTRA) band 1 or 4 configured for a communication with a base station,
   wherein the uplink carrier includes resource blocks which are closest to an E-UTRA band configured for the ProSe communication,
   wherein a center frequency of the uplink carrier is equal 1922.5 MHz and a channel bandwidth of the uplink carrier is equal to 5 MHz, when the E-UTRA band 1 is configured for the communication with the base station and an E-UTRA band 28 is configured for the Prose communication, and
   wherein the center frequency of the uplink carrier is equal to 1752.5 MHz and the channel bandwidth of the uplink carrier is equal to 5 MHz, when the E-UTRA band 4 is configured for the communication with the base station and an E-UTRA band 2 is configured for the Prose communication; and
   measuring the REFSENS for the ProSe communication based on the uplink carrier.

2. The method of claim 1, wherein the E-UTRA band 28, which is configured for the ProSe communication, is related to a band where a serving cell of the base station is not operated or a band where a secondary cell (Scell) of the base station is operated.

3. The method of claim 1, wherein the E-UTRA band 2, which is configured for the ProSe communication, is related to a band where a serving cell of the base station is not operated or a band where a secondary cell (Scell) of the base station is operated.

4. The method of claim 1, wherein the E-UTRA band configured for the ProSe communication includes an uplink operating band and a downlink operating band which have a same frequency range.

5. The method of claim 1,
   wherein the E-UTRA band 1 include an uplink operating band of 1920 MHz-1980 MHz and a downlink operating band of 2110 MHz-2170 MHz, and
   wherein the E-UTRA band 28, which is configured for the ProSe communication, include an uplink operating band of 703 MHz-748 MHz and a downlink operating band of 703 MHz-748 MHz.

6. The method of claim 1,
   wherein the E-UTRA band 4 include an uplink operating band of 1710 MHz-1755 MHz and a downlink operating band of 2110 MHz-2155 MHz, and
   wherein the E-UTRA band 2, which is configured for the ProSe communication, include an uplink operating band of 1850 MHz-1910 MHz and a downlink operating band of 1850 MHz-1910 MHz.

7. A user equipment for measuring a reference sensitivity (REFSENS) for a proximity service (ProSe) communication, the user equipment comprising:
   a transceiver; and
   a processor operatively connected to the transceiver, wherein the processor is configured to:
   control the transceiver to use an uplink carrier for measuring the REFSENS based on an evolved universal terrestrial radio access (E-UTRA) band 1 or 4 configured for a communication with a base station, wherein the uplink carrier includes resource blocks which are closest to an E-UTRA band configured for the ProSe communication, wherein a center frequency of the uplink carrier is equal to 1922.5 MHz and a channel bandwidth of the uplink carrier is equal to 5 MHz, when the E-UTRA band 1 is configured for the communication with the base station and an E-UTRA band 28 is configured for the Prose communication, and wherein the center frequency of the uplink carrier is equal to 1752.5 MHz and the channel bandwidth of the uplink carrier is equal to 5 MHz, when the E-UTRA band 4 is configured for the communication with the base station and an E-UTRA band 2 is configured for the Prose communication, and measure the REFSENS for the ProSe communication based on the uplink carrier.

8. The user equipment of claim 7, wherein the E-UTRA Band 28, which is configured for the ProSe communication, is related to a band where a serving cell of the base station is not operated or a band where a secondary cell (Scell) of the base station is operated.

9. The user equipment of claim 7, wherein the E-UTRA Band 2, which is configured for the ProSe communication, is related to a band where a serving cell of the base station is not operated or a band where a secondary cell (Scell) of the base station is operated.

10. The user equipment of claim 7, wherein the E-UTRA band configured for the ProSe communication includes an uplink operating band and a downlink operating band which have a same frequency range.

11. The user equipment of claim 7, wherein the E-UTRA band 1 include an uplink operating band of 1920 MHz-1980 MHz and a downlink operating band of 2110 MHz-2170 MHz, and wherein the E-UTRA band 28, which is configured for the ProSe communication, include an uplink operating band of 703 MHz-748 MHz and a downlink operating band of 703 MHz-748 MHz.

12. The user equipment of claim 7, wherein the E-UTRA band 4 include an uplink operating band of 1710 MHz-1755 MHz and a downlink operating band of 2110 MHz-2155 MHz, and wherein the E-UTRA band 2, which is configured for the ProSe communication, include an uplink operating band of 1850 MHz-1910 MHz and a downlink operating band of 1850 MHz-1910 MHz.

* * * * *